United States Patent [19]

Wharton

[11] 4,011,000

[45] Mar. 8, 1977

[54] ELECTRICAL RECEPTACLE

[75] Inventor: Richard F. Wharton, Chicago, Ill.

[73] Assignee: Marquis Industries, Inc., Chicago, Ill.

[22] Filed: June 30, 1975

[21] Appl. No.: 591,773

[52] U.S. Cl. ........................ 339/130 C; 339/182 R; 339/209

[51] Int. Cl.² ......................................... H01R 17/18

[58] Field of Search .......... 339/176, 177, 181, 182, 339/183, 180, 130, 209

[56] References Cited

UNITED STATES PATENTS

| | | | |
|---|---|---|---|
| 741,741 | 10/1903 | Tregoning | 339/176 L |
| 1,088,914 | 3/1914 | Marks et al. | 339/180 |
| 1,090,528 | 3/1914 | Freeman | 339/180 |
| 1,380,063 | 5/1921 | Hitner | 339/180 |
| 1,486,691 | 3/1924 | Schwartz | 339/177 E |
| 1,643,655 | 9/1927 | Giles | 339/209 |
| 2,097,795 | 11/1937 | Kelman | 339/180 |
| 2,292,038 | 8/1942 | Benander | 240/73 QD |
| 2,708,714 | 5/1955 | Stevens, Jr. | 339/180 |
| 2,788,501 | 4/1957 | Buquor et al. | 339/176 L |
| 3,040,285 | 6/1962 | Stanley | 339/177 L |

*Primary Examiner*—Roy Lake
*Assistant Examiner*—Neil Abrams
*Attorney, Agent, or Firm*—Gerald M. Newman

[57] ABSTRACT

For use with plugs of the type designed for insertion into cigar lighter receptacles. The new receptacle uses a plastic part as the housing and insulator. A simple open seamed brass cylinder is inserted inside a well of the housing to serve as the negative contact. The positive contact in the center of the bottom of the well is affixed with a rivet. The negative terminal is affixed to the sleeve, and the positive terminal is attached with the rivet. When used as an extension cord, a snap on end cap protects the electrical connections. When used as a portion of a wall receptacle as in recreational vehicles, the plastic housing extends beyond the terminals to prevent a short to the outer metal skin of the vehicle. The receptacle may also be used for a cigar lighter, by using a bi-metal element for the positive contact, and using a high temperature plastic for the housing.

3 Claims, 13 Drawing Figures

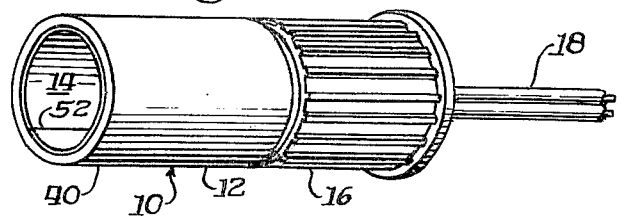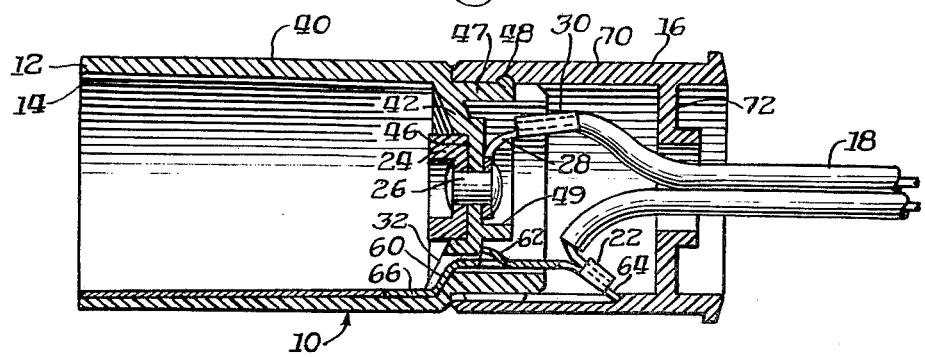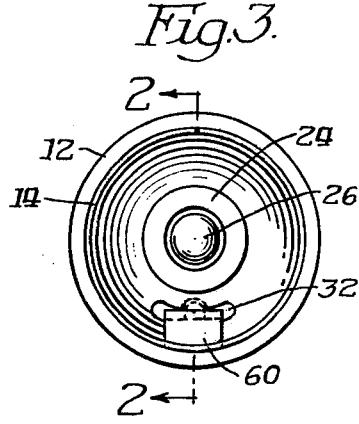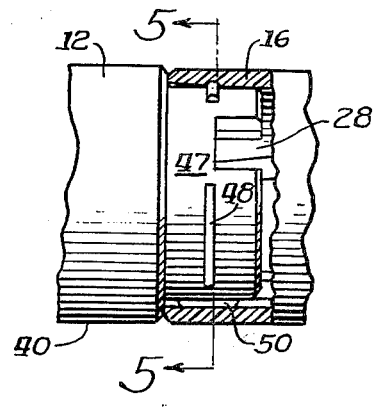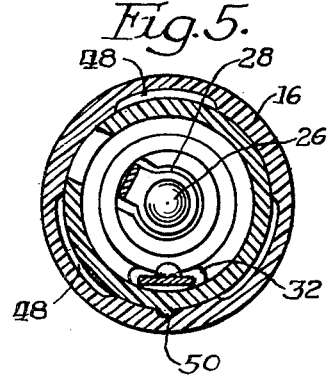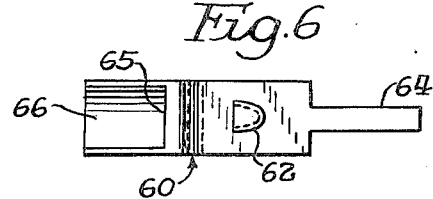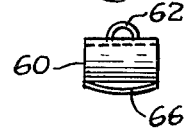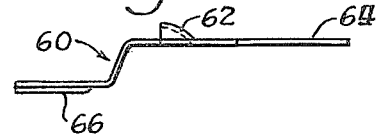

ELECTRICAL RECEPTACLE

BACKGROUND OF THE INVENTION

This invention relates to an electrical receptacle, and more particularly to a receptacle generally similar to those used for cigar lighters to receive a plug for connecting a 6-volt or 12-volt power source to a light or electrical appliance.

Known cigar lighter type receptacles currently being manufactured employ a design concept in which a housing and negative contact of one piece is formed into a deep drawn steel cup. The steel cup has lanced fingers running axially to provide friction on the ash guard of the lighter and is provided with means at the bottom of the cup to receive a ceramic insulator. By various means depending upon the specific manufacturer's design, a male screw thread member is fitted to the closed end of the cup to mate with a deep drawn nut member designed to hold the receptacle in the dash board of an automobile and, depending upon its tightness, to create a ground contact. The aforementioned ceramic insulator is centered in the well and is designed to receive a bi-metal assembly which makes the positive contact with the cigar lighter. When the heating element of the cigar lighter is pressed down into the well, positive contact is made with the outside of the heating element of the bi-metals. The heating element conducts heat to the bi-metals which are designed to distort with heat so that they release the lighter assembly and allow it to "pop out". The lighter assembly will pop out to the extent that is allowed to do so by the lanced fingers in the negative contact well which hold the ash guard in position precluding the lighter from popping completely out of the well.

Adapter plugs were subsequently designed so that trouble lights and other electrical appliances having their own cords could be used in or around automobiles, without requiring the user to provide any special receptacle or connecting means. Such adapter plugs typically comprise a body for insertion into a cigar lighter receptacle, with spring loaded members at the end and on one side to make contact respectively with the bi-metal element and the steel cup.

Extension cords could, of course, use the same type of adapter plug at one end, and require a receptacle at the other end. It was natural to use the standard cigar lighter receptacle design to the maximum extent possible. In one design of a receptacle, the bi-metallic element is removed and replaced by a brass machine screw to make the positive contact and the well is modified only by the deletion of the side lances, which are of course not required for cooperating with adapter plugs. This receptacle is now used as a standard structure for extension cord receptacles. With the advent of recreational vehicles and similar requirements for sources of 12-volt electrical power, these receptacles are also mounted into wall plates for use as 12-volt convenience outlets. For extension cord use, a plastic device similar in shape to a standard bicycle handle grip may be placed around the outside of the receptacle to enhance its appearance and to prevent damage to the electrical connections.

Efforts have been made to reduce the cost of extension cord receptacles by modifying the known product, and also by assembly with available parts, but these efforts have been unsuccessful. There are also certain limitations on existing receptacles from the standpoint of current-carrying capability.

SUMMARY OF THE INVENTION

A primary object of the invention is to provide a lower cost receptacle of the above-type for extension cords and other uses.

In the electrical receptacle of the invention a plastic part is used as a housing and as an insulator and the outer contact (usually negative polarity) is a simple open seamed cylinder inserted with a close fit inside a cylindrical well of the housing. The center contact (usually positive polarity) is affixed in an opening of the housing centered in the bottom of the well. It is not necessary to have screw threads on the center contact — this may for example be a rivet member which is less expensive and also reduces the total number of parts involved.

In an embodiment for extension cords, electrical contact is made to the open seamed sleeve by means of a specially designed part which has a spring finger on it to lock it into the plastic housing once it is inserted. It also has a thin tongue-like extension onto which a crimping band can be affixed in order to make the negative contact to one side of two-conductor wire. The positive contact is made when the rivet is inserted through a standard ring terminal attached to the other wire conductor. This end of the receptacle with the electrical connections is then protected and the assembly completed by the inclusion of a snap-on end cap.

An advantage of this assembly is that cost is reduced by one half. Electrical contact is superior because of the use of a thin-walled brass element which is not as expensive or as complex as the deep drawn steel well counterpart of prior designs. An additional benefit of this method of construction is that the completed assembly is very flexible. The thin-walled metal piece flexes as does the plastic housing, allowing contact to be made with the smallest of adapter plugs (0.824 inch inner diameter), the intermediate sized adapter plug (0.834 inch inner diameter), as well as a German standard adapter plug for certain automobiles (0.890 inch inner diameter).

Another embodiment of the invention employed as a wall plate receptacle is obtained with a slight change in the configuration of the plastic housing. Thus, the same basic design (with the same benefits including wide range of adapter plug sizes) is modified to adapt to a wall plate for a convenience outlet for the recreational vehicle and marine industries. The wall plate receptacle configuration results in several important benefits:

1. It has been designed so that it has a minimum depth from the mounting surface of the wall plate to the back end of the receptacle. It should be noted that the basic design of the standard cigar lighter receptacle has not concerned itself with depth since it is conventionally mounted on an automobile dash board where, because of the amount of room available, depth is not an important consideration. Depth of the receptacle does cause a problem when used in a wall plate where the short distance between the inside and the outside skins of the recreational vehicle must be considered. Most manufacturers of wall plate receptacles have found it necessary to either include a spacer underneath the mounting flange of the negative well in order to reduce the depth of insertion of the receptacle, or have designed their wall plate in an angular configuration so as to make minimum use of the depth between the walls.

2. A second benefit is that since the housing is plastic, in accordance with the invention, the depth of the plastic housing beyond the wall plate receptacle and into the wall is greater than the depth to the positive contact, thereby precluding the possibility of an electrical short circuit against the outside skin or wall of the recreational vehicle.

A further benefit of this design is that all metal parts are brass — there are no dissimilar materials, therefor the basic standard production item is a fully marine qualified product.

Still another embodiment is obtained by inserting a bi-metal element in the basic wall plate receptacle in place of the positive contact thereby producing a cigar lighter receptacle. In this application (but not the others), it is required to use a high temperature-resistant plastic material in order to combat the heat generated by the cigar lighter heating element. Note that the negative tab terminal is an integral feature of this novel design. It is not necessary to make the negative electrical contact by soldering or by means of the addition of a separate tab terminal to the negative nut nor is it necessary to rely on the friction contact between a negative nut and the electrically conductive dashboard.

DESCRIPTION OF DRAWINGS

FIG. 1 is a perspective view of a complete assembly of an extension cord receptacle;

FIG. 2 is a cross-sectional elevational view along the length of the receptacle of FIG. 1, along lines 2—2 of FIG. 3;

FIG. 3 is an elevational view from the left end of the receptacle as shown in FIGS. 1 and 2;

FIG. 4 is a partial view of the receptacle of FIG. 1, with a section of the end cap removed to more clearly show the base of the plastic housing;

FIG. 5 is a cross-sectional view along lines 5—5 of FIG. 4;

FIGS. 6, 7 and 8 are top plan, elevation and end views respectively of a special metal part identified by reference numeral 60 for making electrical connection to the metal sleeve of the receptacle of FIG. 1;

DETAILED DESCRIPTION OF THE INVENTION

Extension Cord Receptacle

Figure 9:
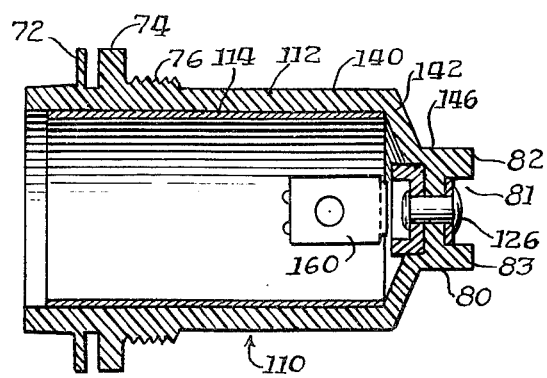
FIGS. 9–11 are views of a wall plate receptacle, FIG. 11 being an end view, and FIGS. 9 and 10 being sectional views lengthwise along lines 9—9 and 10—10 respectively of FIG. 11.

Referring now to FIGS. 1 to 5 of the drawings, the extension cord receptacle of the invention, generally referred to by reference number 10, is seen to comprise a plastic housing 12, a metal sleeve 14 which serves as the negative contact, a positive contact 24, connections to a two conductor electric cord 18, and an end cap 16.

The housing 12 is an insulator molded of a plastic material such as polypropylene. The main portion of this plastic element which serves as a housing and insulator is a cylindrical shell portion 40. The interior forms a well with a bottom having a sloping section 42 and a center cylindrical depression 46. The interior of the cylindrical portion 40 has a slight taper, which may be an inner diameter of 0.830 inch at the bottom and 0.880 inch at the top (left end as seen in FIG. 2). The outer diameter may be 1.026 inches. The depth of the well may be 1.500 inches at the inner edge of sloping part 42 and 1.428 inches at the outer edge. The depression 46 has a relative diameter of 0.446 inch and a relative depth of 0.093 inch. The outer end of the housing (right hand end in FIG. 2) has concentric cylindrical portions 47 and 49. The portion 47 is slightly smaller in diameter than portion 40, and has three circumferential bosses 48 and one axial boss 50 (FIG. 4) on its outer surface for the end cap 16. The portion 49 has an inner diameter of 0.320 inches, and ends ⅛ inch short of the end of portion 47. The portion 47 has a cutout adjacent the positive terminal 28, as shown in FIG. 4.

Sleeve 14 may be formed from suitable material such as 70/30 cartridge brass, spring-tempered having a thickness of 0.015 inches and includes an open seam 52. For the described structure, it is formed into a cylinder having an outer diameter of 0.896 inches, a length of 1⅜ inches and a seam of 0.060 inches wide. There is a cutout at one end for a length of about ½ inch to widen the seam to about ¼ inch. The sleeve is inserted (after attaching part 60) into the well of the housing 12, with the cutout portion at the bottom.

Electrical contact is made to the negative open seamed sleeve 14 by means of a specially designed part 60 which has a spring finger 62 to lock it into the plastic housing 12 once it is inserted. This part is shown separately in FIGS. 6, 7 and 8. It has a thin, tongue-like extension 64 onto which a crimping band 22 can be affixed in order to make the negative contact to one conductor of the cord 18. The end 66 is stamped out so that it is cut along a line 65 to form part of the cylindrical surface. End 66 is attached to sleeve 14 at the bottom opposite to the seam 52. The method of attachment may be by welding or swedging. Housing 12 has an opening 32 through which part 60 is inserted. A conductor of cord 18 is then attached to tongue 64 using crimping band 22.

To form the positive contact, a cup-shaped metal part 24 is placed in the depression 46 of housing 12. A rivet 26 extends through holes of a terminal 28, the housing 12, and member 24. Terminal 28 has a crimping portion 30 for connection to a conductor of cord 18.

End cap 16 includes a cylindrical portion 70 and an inner portion 72 partially closing one end. A hole is provided in the center of portion 72 for the cord 18. The outer surface of portion 70 has axial bosses as shown in FIG. 1 to give a fluted effect. The inner surface has three circumferential grooves and one axial groove which mate with bosses 48 and 49 of housing 12. There are also strengthening ribs (not shown) on the inner surface of portion 70 extending from portion 72 for about half the length. End cap 16 is snapped over portion 47 of the housing 12 to complete the assembly.

Wall Plate Receptacle

Figure 10:
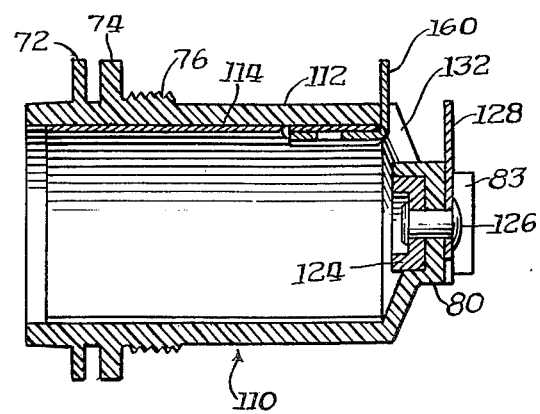
Figure 11:
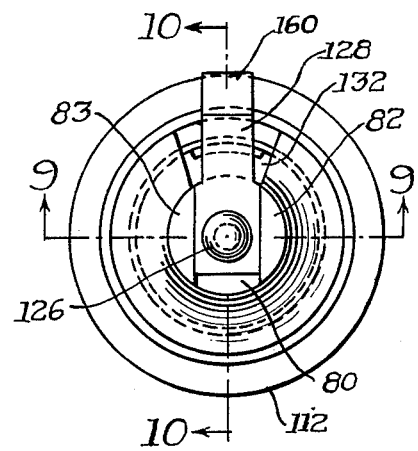

With a slight change in the configuration of the plastic housing the same basic design described above (with the same benefits including acceptance of a wide range of adapter plug sizes) has been modified to adapt to a wall plate for a convenience outlet for the recreational vehicle and marine industries. This receptacle is shown in FIGS. 9, 10 and 11, and is generally referred to by reference character 110. With the well for receiving the plug being essentially the same size as that of the extension cord receptacle, the overall length of the wall plate receptacle is approximately 1 13/16 inches. The open seamed metal sleeve 114 is identical to that of the extension cord receptacle.

The housing 112 is again an insulator molded from a plastic such as polypropylene. The main portion of this plastic part, as in the first embodiment, is a cylindrical shell in which the inside forms a well with a bottom having a sloping part 142 and a center cylindrical depression 146. The internal dimensions of the well are the same as those for the extension cord receptacle. The exterior of portion 140 includes two cylindrical ridges 72 and 74 and a threaded portion 76 molded as an integral part of the housing 112. The purpose of these ridges and threads is to provide a shoulder and mating threads for a threaded nut (not shown) to secure the receptacle to the wall plate. The outer end of housing 112 (at the right in FIGS. 9 and 10) includes a cylindrical extension 80 about ¼ inch long and about 9/16 inch in diameter. The extension defines a groove 81 about ⅛ inch deep and about ⅝ inch wide, having post-like portions 82 and 83 on the sides of groove 81. A hole is provided in the center for rivet 126 and a hole is provided at 132 on one side at the bottom of the well for negative terminal 160.

The electric terminals 160 and 128 are formed from simple pieces of brass which may be 11/16 inch long, with half the length about ¼ inch wide and the other half about 5/16 wide. The negative terminal 160 has its wide end affixed to sleeve 14 on the side opposite the open seam by swedging or arc welding. The narrow end of terminal 160 extending through the hole 132 is bent at a right angle to project outward of the housing as shown in FIG. 10.

The positive contact comprises a cup-shaped metal part 124 identical to part 24 of the extension cord receptacle which is placed in the depression 146. Positive terminal 128 has a rivet hole in the wide end which is placed in groove 81 at the end of housing 112. Rivet 126 extends through the holes in part 124, the housing and terminal 128 to hold them together. The narrow end of positive terminal 128 projects outwardly in the same direction as negative terminal 160, but not as far.

Cigar Lighter Receptacle

Figure 12:
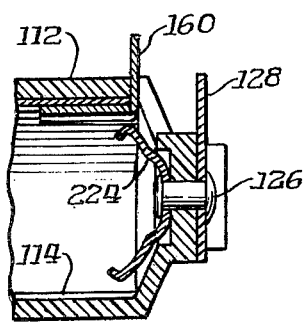
FIG. 12 is a modification of a portion of FIG. 10, showing how a bi-metal member may be included to provide a cigar-lighter receptacle.
Figure 13:
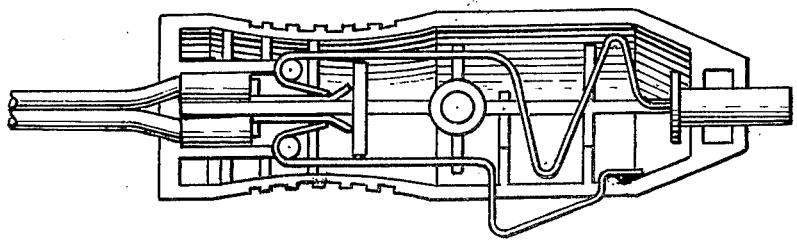
FIG. 13 is a view of an adapter plug suitable for use with receptacles including the receptacle of the invention with one-half of the plastic shell removed.

A cigar lighter receptacle may be produced by taking the basic wall plate receptacle and substituting a bi-metal element for the positive contact. This is shown in FIG. 12, which is a partial sectional view corresponding to FIG. 10. The bi-metal element 224 is shown attached with rivet 126 to positive terminal 128. The receptacle is otherwise the same as the wall plate receptacle and therefore the same reference characters are used. In this application it is required to use a high temperature-resistant plastic material such as polysulphone in order to combat the heat generated by the cigar lighter heating element.

It is obvious that upon study by those skilled in the art, the disclosed invention may be altered or modified both in physical appearance and in construction without departing from its inventive concept. Therefore, the scope of protection to be given this invention should not be limited by the embodiments described above but should be determined by the essential descriptions thereof which appear in the appended claims.

I claim:
1. An electrical receptacle for use with a plug of the type having a first spring-loaded contact member at the center of one end, and a second spring-loaded contact member on one side;
   said electrical receptacle comprising a housing, a sleeve within said housing, a center contact member, and first and second terminal members affixed respectively to said center contact member and to said sleeve;
   said housing being of insulating material with an opening forming a well and having a bottom portion at one end of said well, said well having a generally cylindrical side wall which is tapered with the diameter at the bottom slightly smaller than the diameter at the top open end, said bottom portion having a center opening surrounded by a short cylindrical depression which in turn is surrounded by a surface sloping upward from the depression to the bottom of the side wall, and a side opening through which said second terminal member extends;
   said first terminal member having a ring at one end; said center contact member being a cup-shaped metal member which fits in said depression, having a hole in its center, and shaped to receive said first spring-loaded contact member of said plug; fastening means extending in order through said hole in the center contact member, said center opening of said housing, and said ring of the first terminal member to thereby affix both the center contact member and the first terminal member to the housing;
   said sleeve being of relatively thin, smooth metallic material formed into only a cylinder with an open seam parallel to the axis, and inserted with a close fit within said well adjacent said side wall;
   the shape and dimensions within said well being such that said plug may be inserted with a straight motion with said first spring-loaded contact member entering said cup-shape of said center contact member and being compressed against said fastening means, and said second spring-loaded contact member sliding along and being compressed against said sleeve.

2. An electrical receptacle as set forth in claim 1, for use on an extension cord;
   said fastening means being a rivet extending through the ring and through said hole in the center of said center contact member;
   wherein said second terminal member has a section at one end stamped into a partial cylindrical form of substantially the same radius as said sleeve and affixed to the sleeve, an offsetting section sloping along said bottom portion of the housing, a section bent to pass through said side opening, a finger on the last said section which locks it to the outside of said bottom portion, and a narrowed tongue-like end section for one of the conductors of the extension cord to be affixed with a crimping band;
   and an end cap for protecting said first and second contact members, said housing having an extension of reduced diameter on the outside of said bottom portion, the end cap having an outer cylindrical surface of substantially the same diameter as the outer surface of the housing and an inner surface which mates over said extension of the housing, so that the housing and end cap together have a substantially continuous outer cylindrical surface, the end cap having an end wall inward from the end thereof, with a hole in the center of said end wall for the extension cord.

3. An electrical receptacle as set forth in claim 1, for use as a wall receptacle for mounting in a wall with a wall plate;

said fastening means being a rivet extending through the ring and through said hole in the center of said center contact member, the first terminal member extending straight to the side from the rivet perpendicular to the axis of said well;

said second contact member being simply bent with two arms at right angles, with one arm affixed to said sleeve, and the other arm extending outward to the side from said side opening;

said housing having an extension on the outside of said bottom portion with parts of said extension projecting beyond said first and second contact member to protect them from contact with the outer skin of the wall;

said housing having ridges and a threaded portion on its outer surface toward the top end to provide a shoulder and mating threads for a threaded nut to secure the receptacle to a wall plate.

* * * * *